J. AUGSPURGER.
Colter for Plows.
No. 202,624. Patented April 23. 1878.
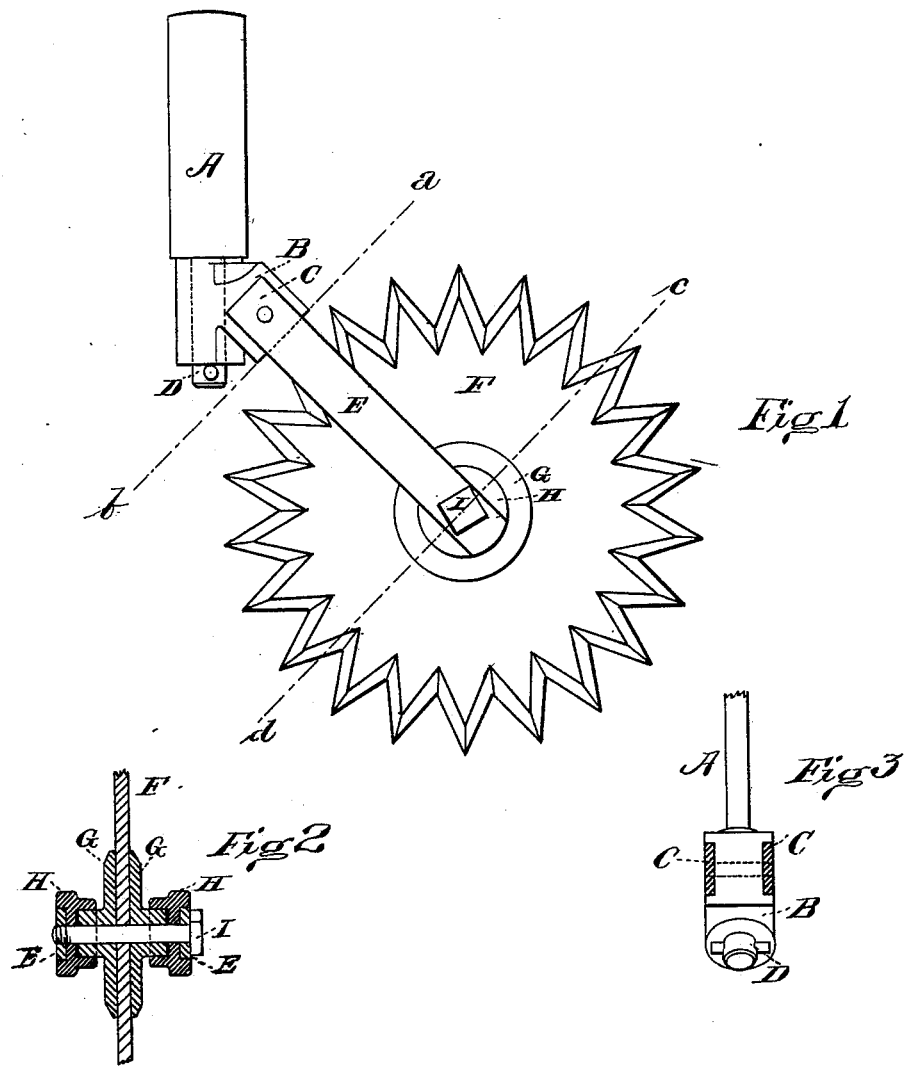

UNITED STATES PATENT OFFICE.

JOHN AUGSPURGER, OF TRENTON, OHIO.

IMPROVEMENT IN COLTERS FOR PLOWS.

Specification forming part of Letters Patent No. 202,624, dated April 23, 1878; application filed November 16, 1877.

*To all whom it may concern:*

Be it known that I, JOHN AUGSPURGER, of Trenton, in Butler county, Ohio, have invented a new and useful Improvement in Colters for Plows; and I do hereby declare that the following is a full, clear, and exact description thereof, reference being had to the accompanying drawings and to the letters of reference marked thereon.

Figure 1 represents a side elevation of my improvement. Fig. 2 represents a central transverse section of the rotary cutter, with the mechanism securing it to the shanks of the caster-hub. Fig. 3 represents a section taken at line $a\,b$ of Fig. 1.

The object of my invention is to provide an efficient and cheap colter for plows, constructed as hereinafter described.

I construct the cutting-disk F with a serrated edge, formed of short lancet-points beveled equally upon both sides, for cutting roots, stalks, or other vegetable matter.

The disk F is clamped between the collars G G, which have arbors fitting into the capped boxes H H, and the axle-bolt I secures the parts together.

The shank A, which is to be secured to a plow-beam, is provided with the spindle D, upon which the caster-hub B works. This hub B and the parts G and H are of cast metal.

The lug cast upon the hub B is made with two rectangular recesses, C, as represented in Fig. 3, and the capped boxes H are also cast with corresponding rectangular recesses across their outer ends, as shown in Fig. 2; and these parts B and H are connected by the strong wrought-metal bars E, which have their front ends fitted into the recesses C C, respectively, and their opposite ends fit the corresponding recesses cast in the outer faces of boxes H H.

The caps of boxes H fit over the ends of the arbors of disks G, and protect the bearings of the rotary cutter F from grass and other obstructing matter.

The use of the wrought-iron straps E, with the cast-metal hub and boxes, greatly cheapens the cost of the structure and affords greater strength with less weight of material, and a greater length of bearing for spindle D is thus more cheaply provided. Besides, the bearings, being of chilled castings, are stronger and more durable than when of wrought metal.

The use of my improvement has proven its especial utility and superiority as a colter for plows, particularly when used upon rooty ground, and when stalks and other obstructing matter upon the ground has to be cut in order to be plowed under.

The parts B, H H, and E E are constructed separately, as stated, and are connected by the axle-bolt I and a bolt or rivet passing through the lug of hub B and the straps E, as represented in the drawings.

I am aware that various combinations of mechanism have been used to support the revolving colter; and, among others, the patents numbered 171,692 and 167,256 represent devices to support the colters upon both sides, and contain the means of adjusting them; but the mechanism employed in my improvement is more simple and cheap to construct; besides, it is a reliable and substantial means of preventing the rotary colter from wabbling or yielding laterally while in use.

I claim and desire to secure by Letters Patent as my invention—

The caster-hub B, having the lug provided with recesses C C, in combination with wrought-metal straps E, for supporting rotary cutter F, in the manner substantially as described.

Witness my hand this 8th day of October, 1877.

JOHN AUGSPURGER.

Witnesses:
H. P. K. PECK,
I. P. P. PECK.